US010315772B2

(12) United States Patent
Ehrmann et al.

(10) Patent No.: US 10,315,772 B2
(45) Date of Patent: Jun. 11, 2019

(54) SEAT UNIT

(71) Applicant: Zodiac Seats France, Issoudun (FR)

(72) Inventors: Charles Ehrmann, Issoudun (FR);
Bastien Bonnefoy, Issoudun (FR);
Victor Carlioz, Pismo Beach, CA (US);
Laurent Ligonnière, Issoudun (FR);
Felix Lorsignol, Pismo Beach, CA (US)

(73) Assignee: Zodiac Seats France, Issoudun (FR)

(*) Notice: Subject to any disclaimer, the term of this patent is extended or adjusted under 35 U.S.C. 154(b) by 0 days.

(21) Appl. No.: 15/302,524

(22) PCT Filed: Apr. 7, 2015

(86) PCT No.: PCT/IB2015/052516
§ 371 (c)(1),
(2) Date: Oct. 7, 2016

(87) PCT Pub. No.: WO2015/155687
PCT Pub. Date: Oct. 15, 2015

(65) Prior Publication Data
US 2017/0029118 A1 Feb. 2, 2017

Related U.S. Application Data

(60) Provisional application No. 61/976,033, filed on Apr. 7, 2014.

(51) Int. Cl.
*B64D 11/06* (2006.01)
*B60N 2/34* (2006.01)

(52) U.S. Cl.
CPC ............ *B64D 11/0641* (2014.12); *B60N 2/34* (2013.01); *B64D 11/0601* (2014.12);
(Continued)

(58) Field of Classification Search
CPC . B64D 11/0641; B64D 11/601; B64D 11/064; B64D 11/0644; B60N 2/34
(Continued)

(56) References Cited

U.S. PATENT DOCUMENTS 6,059,364 A * 5/2000 Dryburgh ............. A47C 1/0352
297/354.13 X
7,284,799 B2 * 10/2007 Chung ................... B60N 2/767
297/411.38 X (Continued)

FOREIGN PATENT DOCUMENTS

DE 102006007854 8/2007
EP 2275345 1/2011
(Continued)

OTHER PUBLICATIONS

International Patent Application No. PCT/IB2015/052516, Invitation to Pay Additional Search Fee and Partial Search Report dated Jun. 26, 2015.
(Continued)

*Primary Examiner* — Anthony D Barfield
(74) *Attorney, Agent, or Firm* — Kilpatrick Townsend & Stockton LLP; Dean W. Russell; Davidson G. Lucas

(57) ABSTRACT

Described are seat units having at least one seat (12) with an upper seat back cushion (32), a lower seat back cushion (34), and a seat pan cushion (36). The at least one seat is configured to transition between a seat position and a bed position. The upper seat back cushion and the lower seat back cushion are separated by a gap (56) located between an end of each cushion when the at least one seat is in the seat position. In contrast, the ends of the cushions are flush with each other when the at least one seat is in the bed position. The seat pan cushion is positioned below a passenger's buttocks when the at least one seat transitions between the
(Continued)

seat position and the bed position without additional adjustment by the passenger.

26 Claims, 15 Drawing Sheets

(52) U.S. Cl.
CPC ........ *B64D 11/064* (2014.12); *B64D 11/0644* (2014.12); *Y02T 50/46* (2013.01)

(58) Field of Classification Search
USPC ........................................ 297/354.13, 411.38
See application file for complete search history.

(56) References Cited

U.S. PATENT DOCUMENTS

| | | | |
|---|---|---|---|
| 7,419,214 B2* | 9/2008 | Plant | ........................ B60N 2/34 297/354.13 X |
| 7,523,888 B2* | 4/2009 | Ferry | ..................... B60N 2/206 297/354.13 X |
| 2004/0036336 A1* | 2/2004 | Veneruso | ............. B60N 2/0232 297/354.13 X |
| 2011/0011977 A1 | 1/2011 | Olliges | |
| 2012/0298798 A1 | 11/2012 | Henshaw et al. | |
| 2013/0248655 A1 | 9/2013 | Kroll et al. | |
| 2015/0136904 A1 | 5/2015 | Savard et al. | |

FOREIGN PATENT DOCUMENTS

| | | |
|---|---|---|
| GB | 2442386 | 4/2008 |
| JP | S56-163606 A | 12/1981 |
| JP | S57-118954 U | 7/1982 |
| JP | S58-022316 U | 2/1983 |
| JP | S59-124745 U | 8/1984 |
| JP | S60-131331 A | 7/1985 |
| JP | S60-179773 U | 11/1985 |
| JP | H02-084734 U | 7/1990 |
| JP | H05-246355 A | 9/1993 |
| JP | 2008-087740 A | 4/2008 |
| WO | 2013166390 | 11/2013 |
| WO | 2015155687 | 10/2015 |

OTHER PUBLICATIONS

International Patent Application No. PCT/IB2015/052516, Search Report and Written Opinion dated Sep. 2, 2015.
Japan Patent Application No. 2016-561276, Notice of Reasons for Rejection (Office Action) dated Mar. 5, 2019.

* cited by examiner

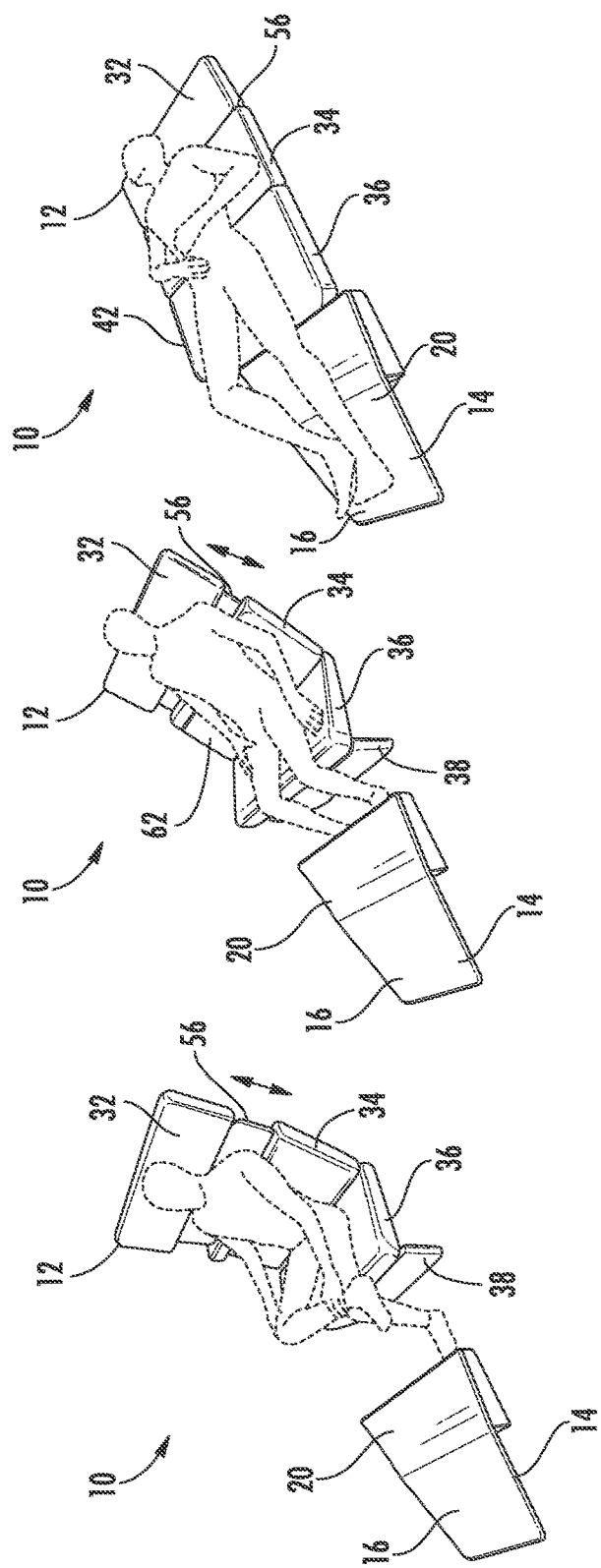

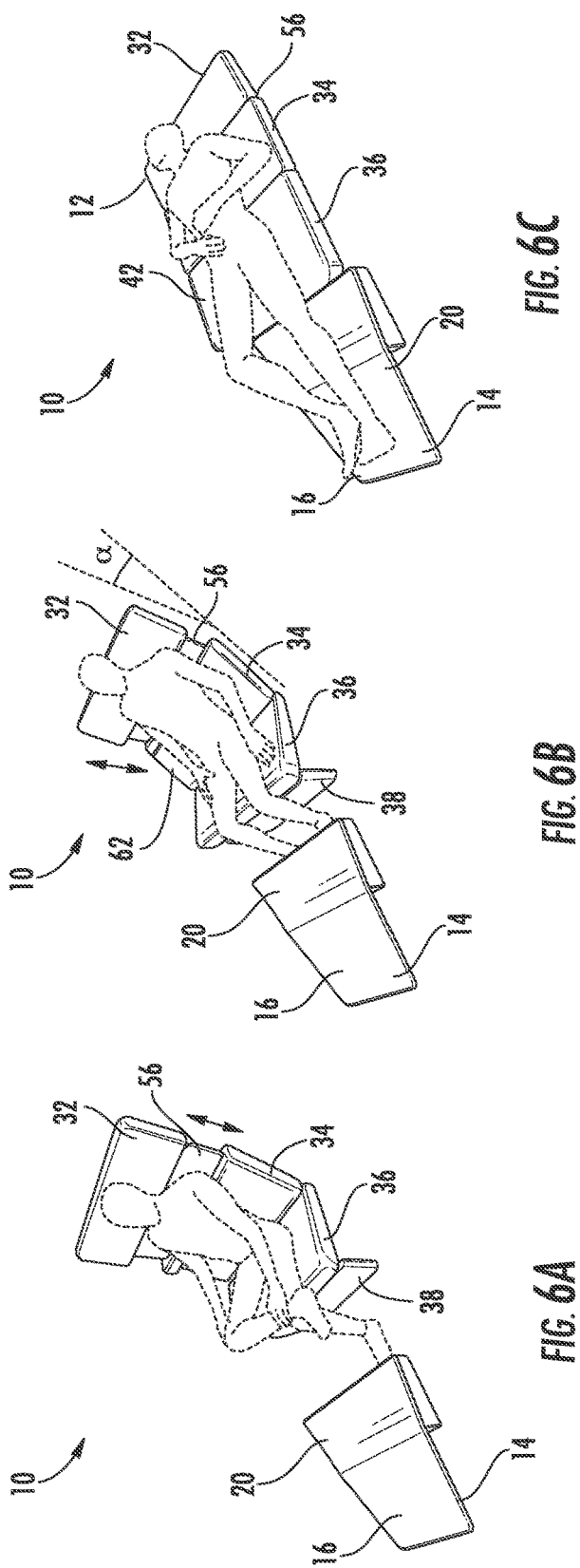

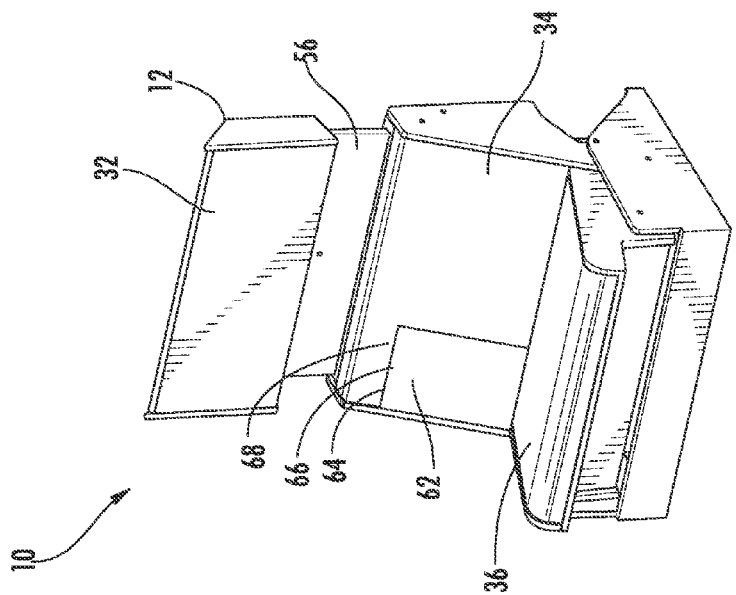
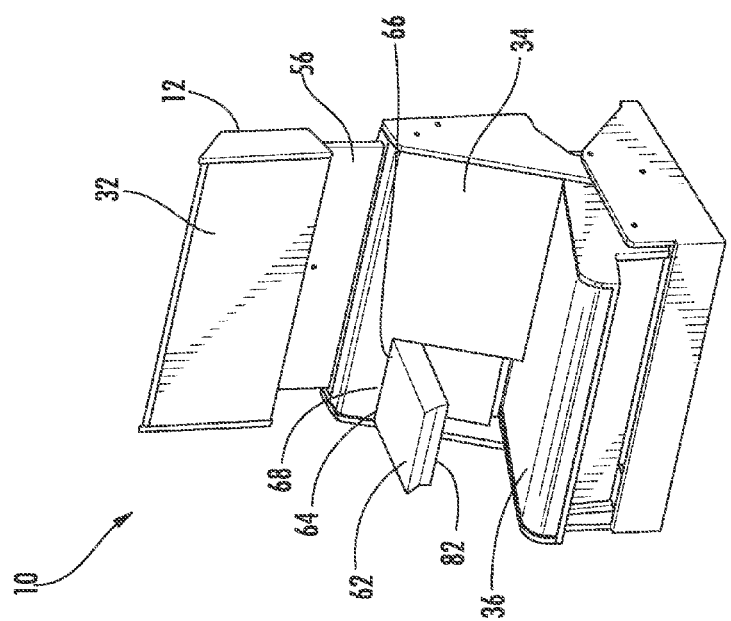

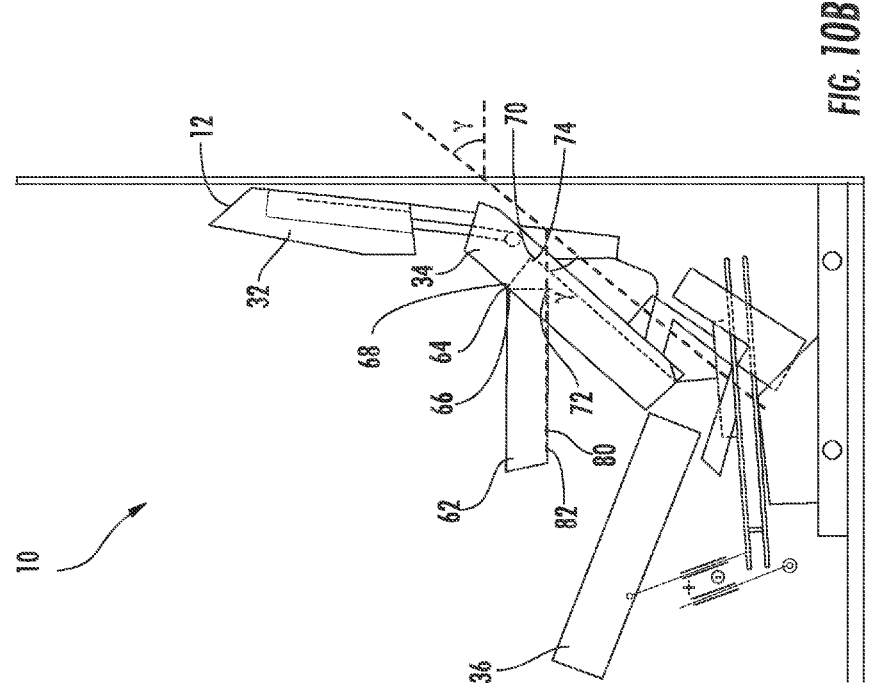
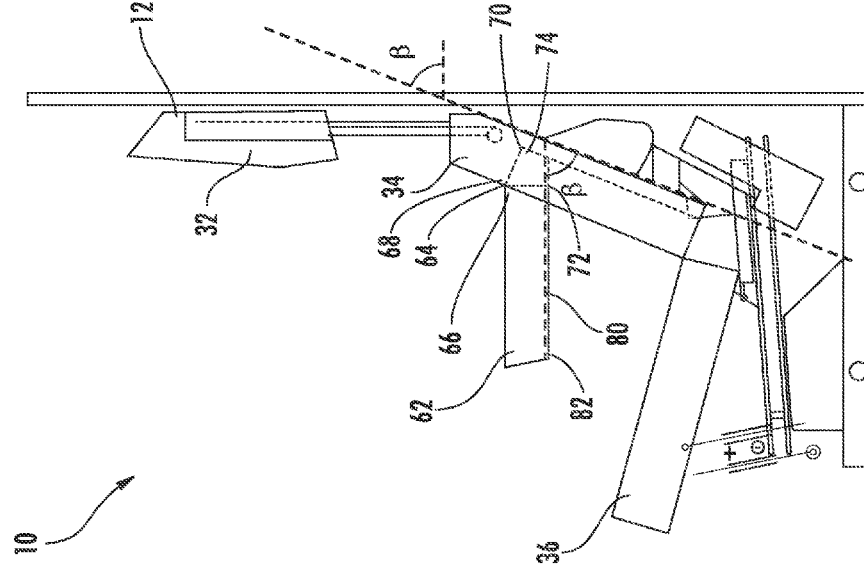

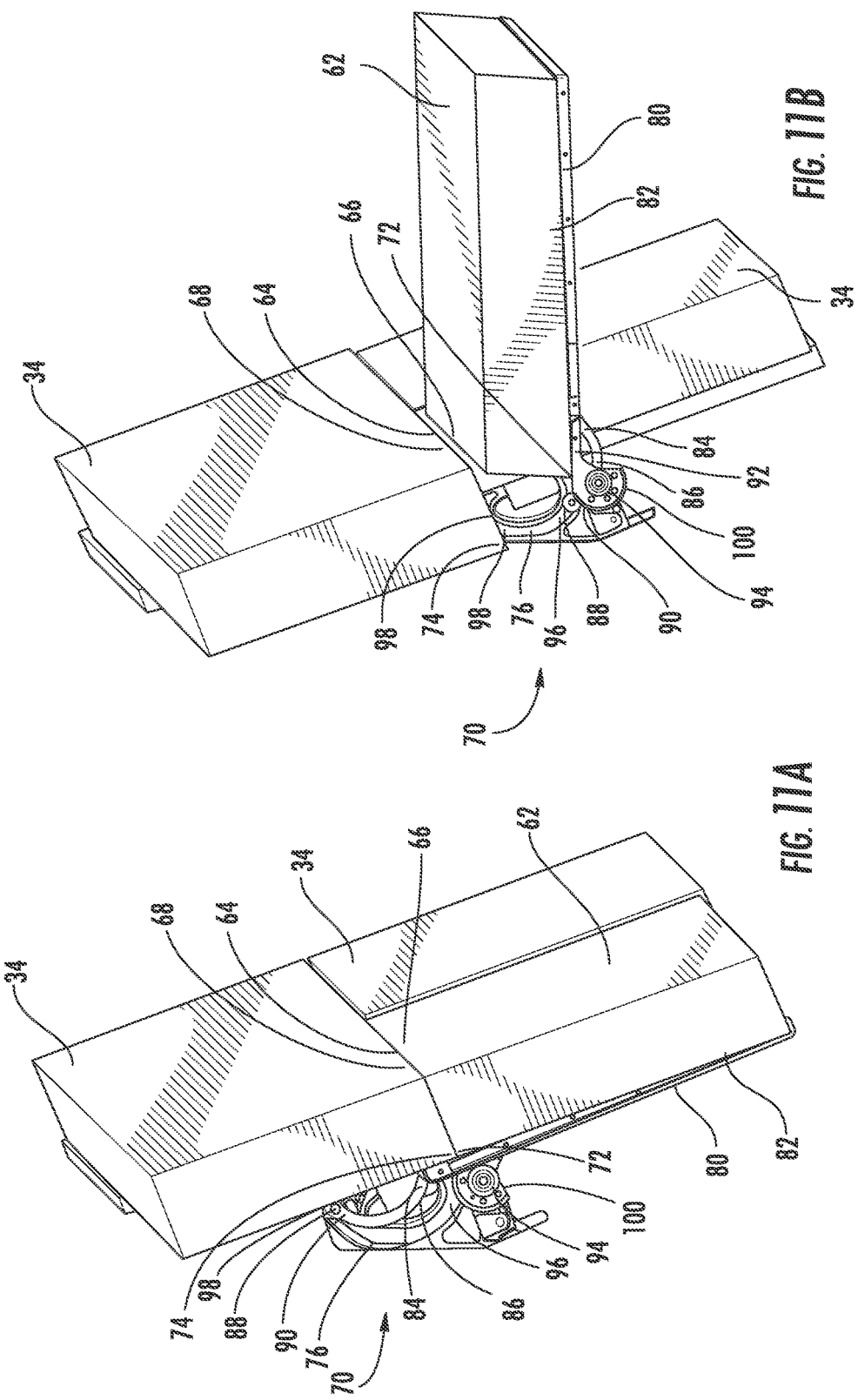

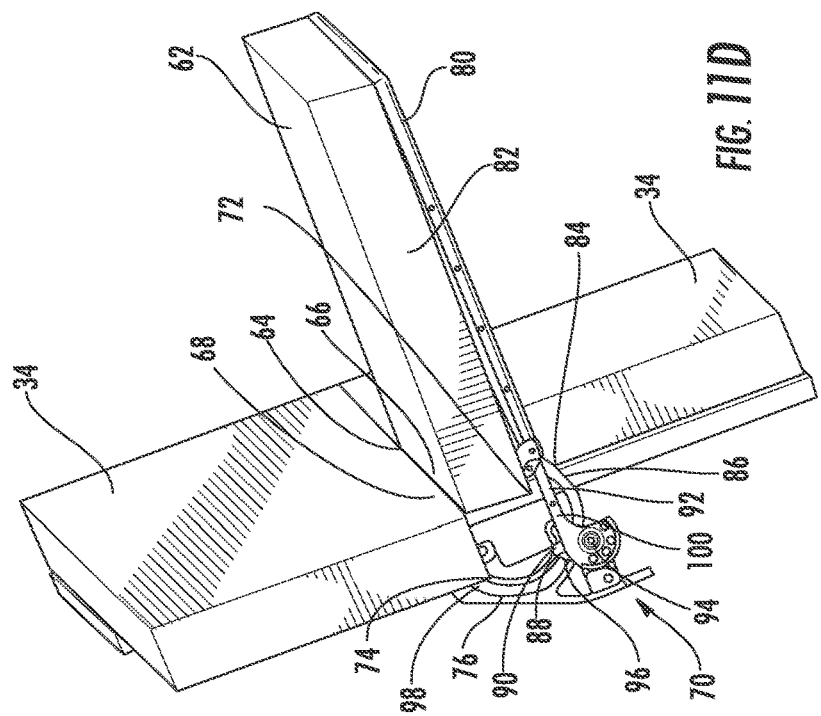
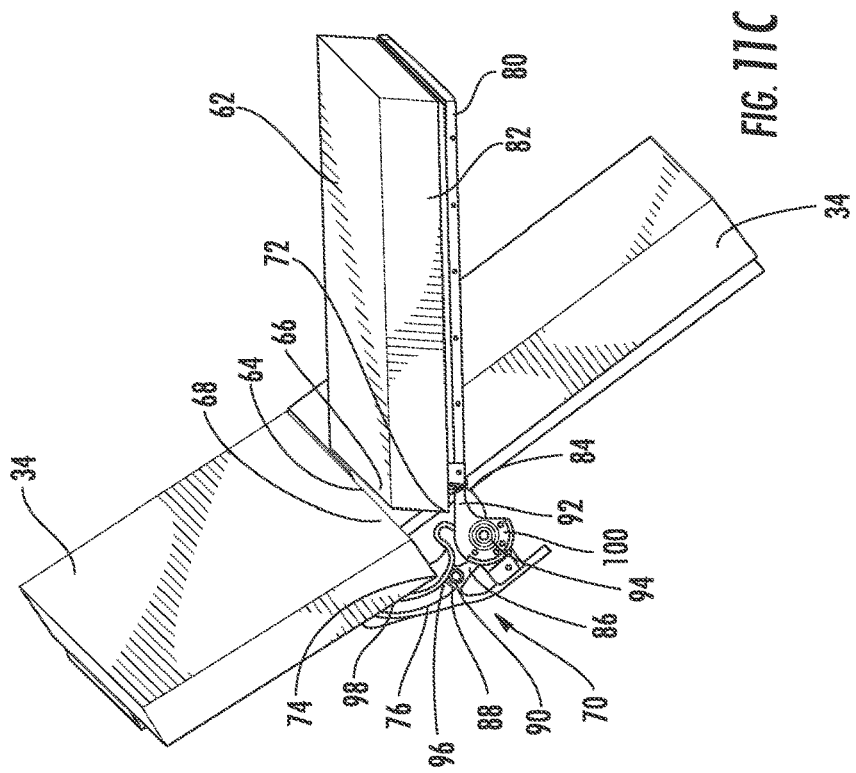

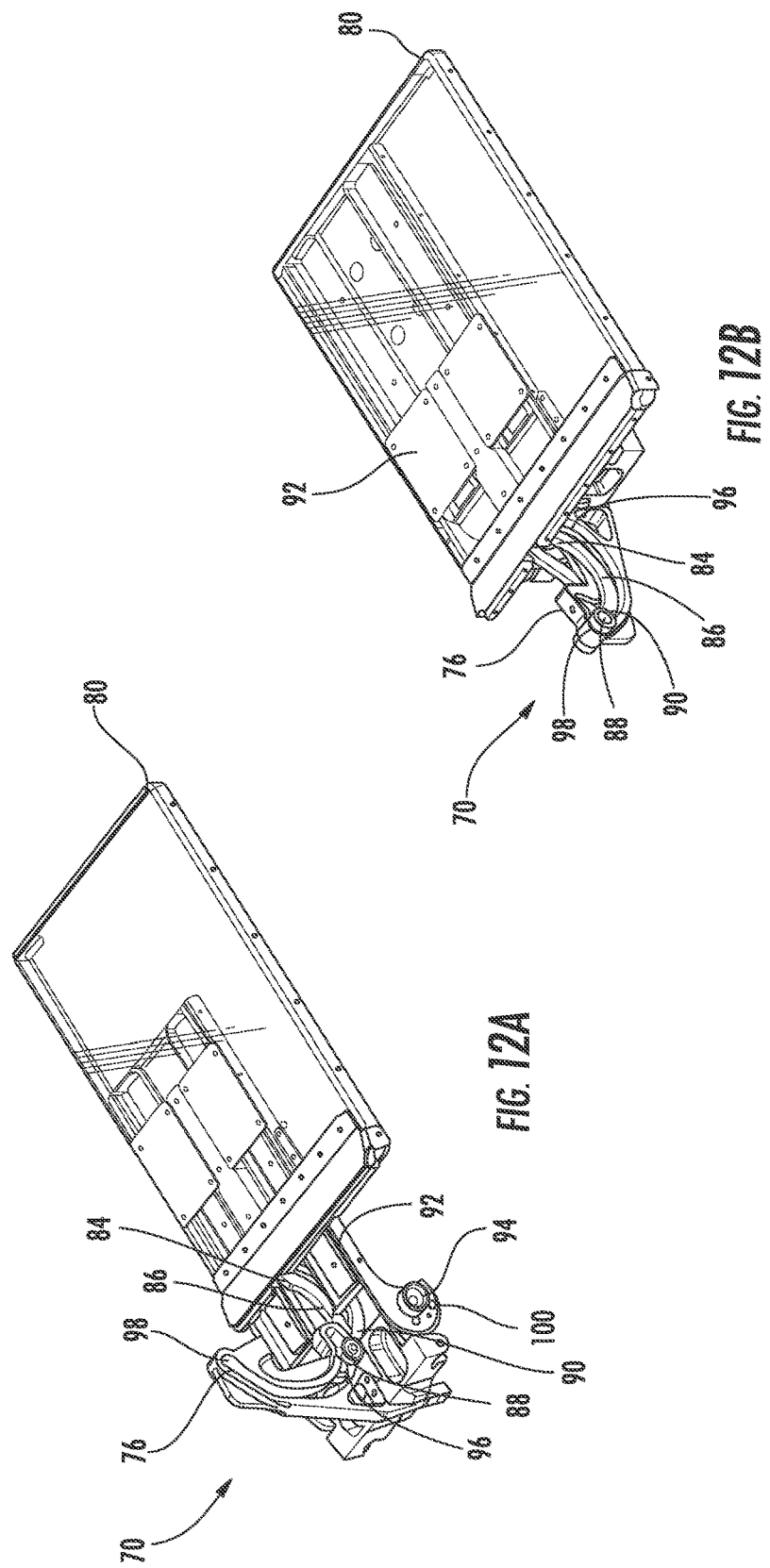

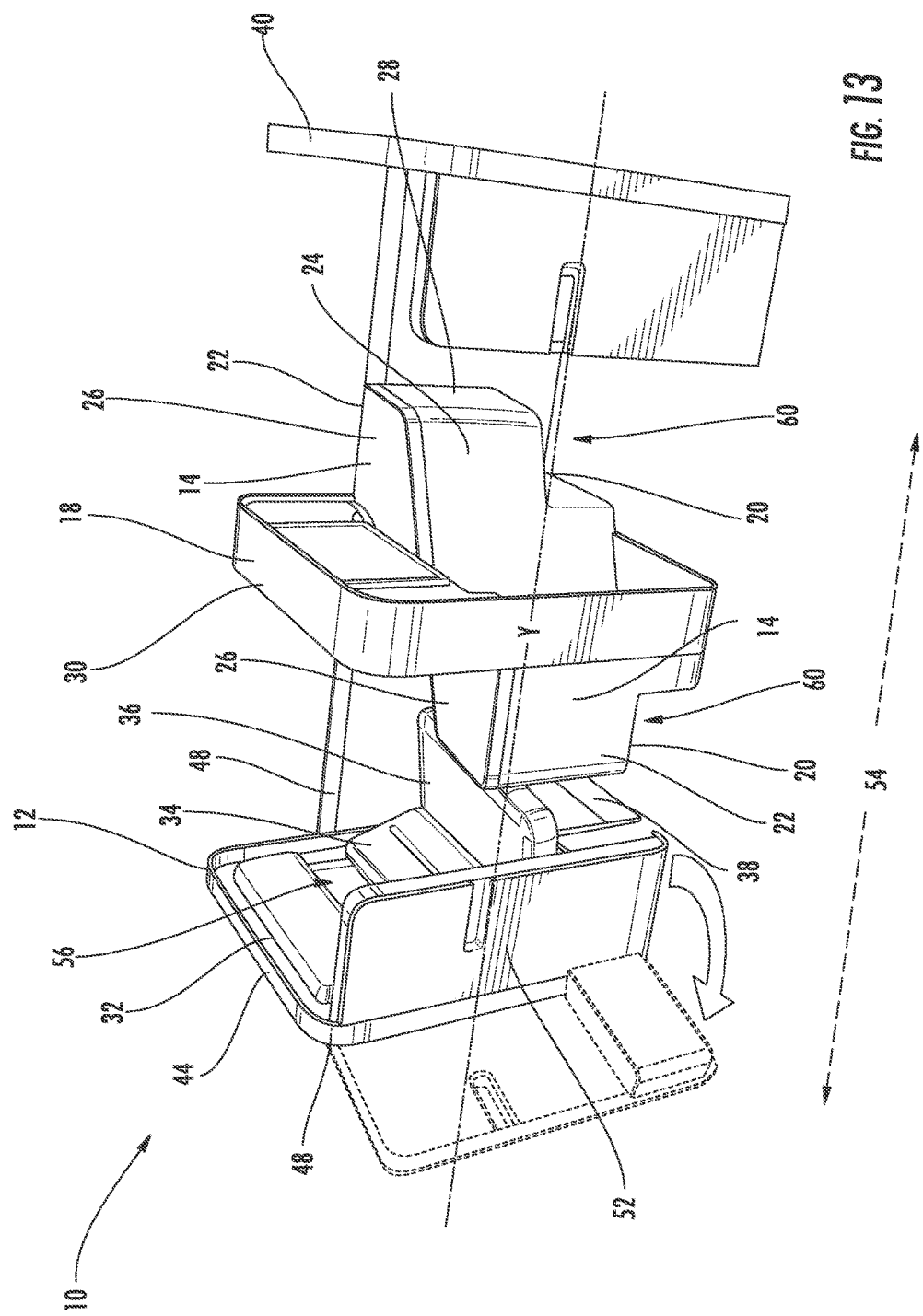

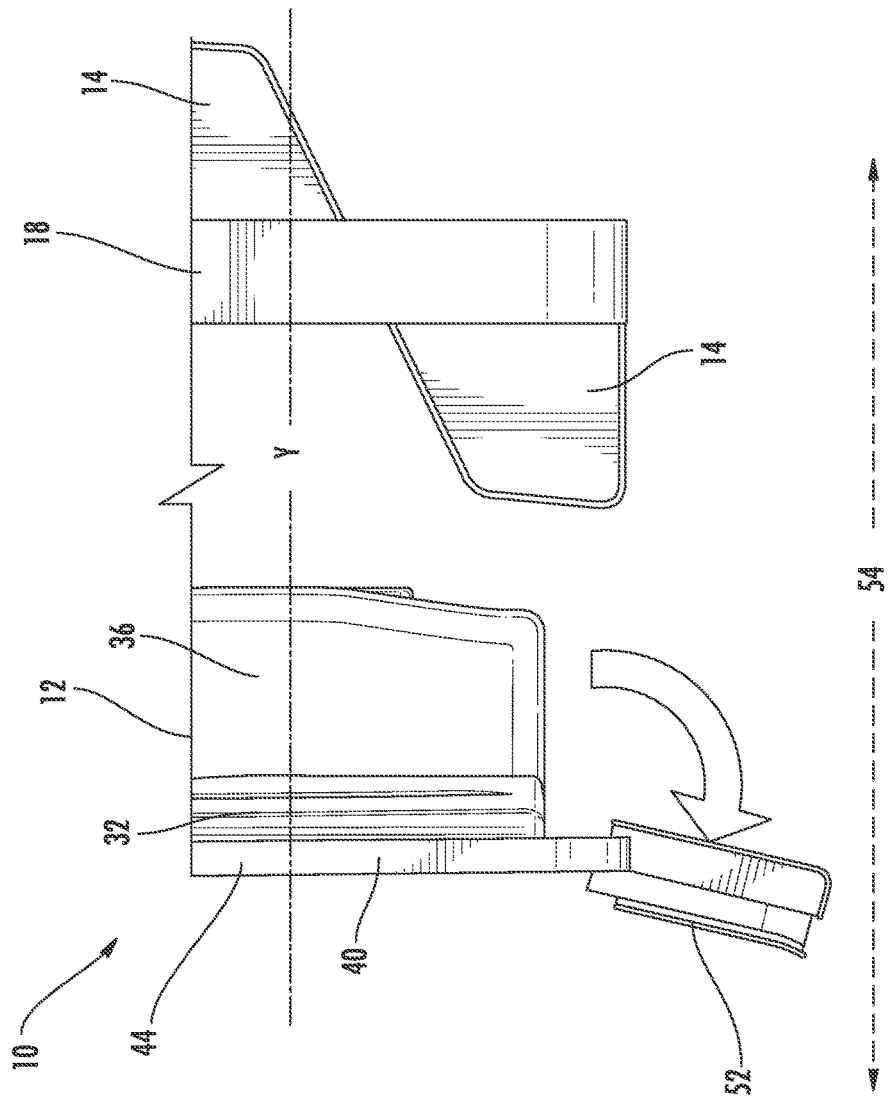

SEAT UNIT

CROSS REFERENCE TO RELATED APPLICATIONS

This application is the U.S. national phase entry of International Patent Application Serial No. PCT/IB2015/052516 ("the '516 application"), filed on Apr. 7, 2015, which application is related to and claims priority benefits from U.S. Provisional Application Ser. No. 61/976,033 ("the '033 application"), filed on Apr. 7, 2014, entitled Premium Seat Functionalities. The '516 and '033 applications are hereby incorporated in their entireties by this reference.

FIELD OF THE INVENTION

The invention relates to seat units for vehicle cabins, particular seat units comprising two seats arranged in opposing directions.

BACKGROUND

As is well-known, business class aircraft seats offer passengers different comfort positions, from the seat position to a bed position that is substantially horizontal in flight.

Business class aircraft seat units have also been designed that offer both forward and aft facing seats, which are usually overlapping with one another to take advantage of the additional space at one passenger's feet to provide additional space for another passenger's upper body. Furthermore, these arrangements typically do not provide secondary seating arrangements for visiting passengers.

These business seat units are typically a conventional width used for business class passenger seats and therefore do not provide other options for passengers to be seated with their bodies in multiple orientations relative the orientation of the seat.

In certain cases, multiple seating orientations may be provided by separating the backrest into an upper back cushion and a lower back cushion separated by a gap. In such examples, the upper back cushion may be fixed in place, while the lower back cushion converts into a bed position. Without inclusion of the upper back cushion in the bed position, the lower back cushion is typically not tall enough to extend the entire length of the passenger's back. As a result, the seat pan cushion is positioned below a portion of the passenger's back in the bed position, and the leg rest cushion is positioned below the passenger's buttocks and legs. As a result, the passenger must physically slide back so that his buttocks is positioned on the seat pan cushion before transitioning the seat from the bed position to the upright position to avoid falling as the leg rest cushion retracts.

Thus, it may be desirable to provide a seat unit designed to accommodate multiple seating orientations through the use of separated back cushions in an upright or reclined position, while also utilizing a bed position that utilizes both back cushions to form a bed surface that allows the seat pan cushion to remain positioned below a passenger's buttocks in the bed position, as well as the upright and reclined positions.

SUMMARY OF THE INVENTION

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a seat unit comprises at least one seat comprising an upper seat back cushion, a lower seat back cushion, and a seat pan cushion, wherein the at least one seat is configured to transition between a seat position and a bed position, wherein the upper seat back cushion and the lower seat back cushion are separated by a gap located between an end of each cushion when the at least one seat is in the seat position, and the ends of the cushions are flush with each other when the at least one seat is in the bed position.

In certain embodiments, the seat pan cushion is positioned below a passenger's buttocks when the at least one seat transitions between the seat position and the bed position without additional adjustment by the passenger.

In some embodiments, the seat unit further comprises at least one footwell comprising a lower surface having an end that is positioned flush with an end of the seat pan cushion to form a horizontal bed surface in the bed position.

The seat unit may further comprise two seats arranged facing one another, the two seats being substantially laterally aligned with each other and with respect to a longitudinal axis of the seat unit, and two footwells arranged facing in opposing directions so that an opening in each footwell is accessible by a passenger seated in one of the two seats that faces the opening in the footwell. In some embodiments, a portion of the seat pan cushion of one of the two seats fits into a recess below the footwell with the opening that faces away from the seat.

According to some embodiments, the seat unit further comprises an armrest pivotally coupled to the lower seat back cushion by a pivot mechanism. The pivot mechanism may be coupled to a back edge of the lower seat back cushion and to a back edge of the armrest and may be configured to move the back edge of the armrest along an arc, forming a pivot axis between a front edge of the lower seat back cushion and a front edge of the armrest. In some embodiments, a deployed angle of the armrest is adjustable to achieve a substantially horizontal orientation of the armrest when the at least one seat is in an upright position or a reclined position. The pivot mechanism may comprise a friction hinge or ratchet mechanism to maintain a deployed angle of the armrest. In some embodiments, the location of the pivot mechanism allows the armrest to have the same cushioning thickness as the lower seat back cushion.

In some embodiments, the seat unit further comprises a closet pivotally coupled to a location adjacent the at least one seat and is configured to pivot away from the at least one seat to provide additional space to access the at least one seat.

According to certain embodiments of the present invention, a seat unit comprises at least one seat comprising an upper seat back cushion and a lower seat back cushion, wherein the at least one seat is configured to transition between an upright position, a reclined position, and a bed position, wherein the upper seat back cushion and the lower seat back cushion are separated by a gap located between an end of each cushion when the at least one seat is in the upright position and the reclined position, and the ends of the cushions are flush with each other when the at least one seat is in the bed position, and wherein the lower seat back cushion is substantially parallel with the upper seat back cushion in the upright position, the reclined position, and/or the bed position, and the lower seat back cushion may be angled with respect to the upper seat back cushion in the reclined position.

According to some embodiments, the seat unit further comprises an armrest pivotally coupled to the lower seat back cushion by a pivot mechanism. The pivot mechanism may be coupled to a back edge of the lower seat back cushion and to a back edge of the armrest and may be configured to move the back edge of the armrest along an arc, forming a pivot axis between a front edge of the lower seat back cushion and a front edge of the armrest. In some embodiments, a deployed angle of the armrest is adjustable to achieve a substantially horizontal orientation of the armrest when the at least one seat is in an upright position or a reclined position. The pivot mechanism may comprise a friction hinge or ratchet mechanism to maintain a deployed angle of the armrest. In some embodiments, the location of the pivot mechanism allows the armrest to have the same cushioning thickness as the lower seat back cushion.

In some embodiments, the seat unit further comprises a closet pivotally coupled to a location adjacent the at least one seat and is configured to pivot away from the at least one seat to provide additional space to access the at least one seat.

According to certain embodiments of the present invention, a seat unit comprises at least one seat comprising a lower seat back cushion comprising an armrest pivotally coupled to the lower seat back cushion by a pivot mechanism, wherein the pivot mechanism is coupled to a back edge of the lower seat back cushion and to a back edge of the armrest and configured to move the back edge of the armrest along an arc, forming a pivot axis between a front edge of the lower seat back cushion and a front edge of the armrest.

In some embodiments, a deployed angle of the armrest is adjustable to achieve a substantially horizontal orientation of the armrest when the at least one seat is in an upright position or a reclined position. The pivot mechanism may comprise an arcuate track and/or a friction hinge or ratchet mechanism to maintain a deployed angle of the armrest. In certain embodiments, the location of the pivot mechanism allows the armrest to have the same cushioning thickness as the lower seat back cushion.

BRIEF DESCRIPTION OF THE DRAWINGS

In the following detailed description, embodiments of the invention are described referring to the following figures:

FIG. 5A is a perspective view of a seat unit in a fully upright position, according to certain embodiments of the present invention.

FIG. 5B is a perspective view of the seat unit of FIG. 5A in a fully reclined position.

FIG. 5C is a perspective view of the seat unit of FIG. 5A in a bed position.

FIG. 6A is a perspective view of a seat unit in a fully upright position, according to certain embodiments of the present invention.

FIG. 6B is a perspective view of the seat unit of FIG. 5A in a fully reclined position.

FIG. 6C is a perspective view of the seat unit of FIG. 5A in a bed position.

FIG. 9A is a perspective view of a seat unit having an armrest pivotally coupled to a lower seat back cushion and in a deployed position, according to certain embodiments of the present invention.

FIG. 9B is a perspective view of the seat unit of FIG. 9A with the armrest in a stowed position.

FIG. 10A is a side view illustrating the kinematics of a seat unit with the seat unit in a fully upright position and an armrest in a deployed position, according to certain embodiments of the present invention.

FIG. 10B is a side view of the seat unit of FIG. 10A with the seat unit in a fully reclined position and the armrest in a deployed position.

FIG. 11A is a perspective view of a lower seat back cushion and an armrest, with the lower seat back cushion in a fully upright position, and the armrest in a stowed position, according to certain embodiments of the present invention.

FIG. 11B is a perspective view of the lower seat back cushion and armrest of FIG. 11A, with the lower seat back cushion in a fully upright position, and the armrest in a deployed position.

FIG. 11C is a perspective view of the lower seat back cushion and armrest of FIG. 11A, with the lower seat back cushion in a fully reclined position, and the armrest in a deployed position.

FIG. 11D is a perspective view of the lower seat back cushion and armrest of FIG. 11A, with the lower seat back cushion in a fully upright position, and the armrest in an unlocked position.

FIG. 12A is a perspective view of a pivot mechanism used to couple an armrest to a lower seat back cushion, with the pivot mechanism in a deployed position, according to certain embodiments of the present invention.

FIG. 12B is a perspective view of the pivot mechanism of FIG. 12A, with the pivot mechanism in a stowed position.

FIG. 13 is a perspective view of a seat unit comprising a pivoting closet, according to certain embodiments of the present invention.

FIG. 14 is a top view of the seat unit of FIG. 13 with the closet in an open position.

DETAILED DESCRIPTION

Figure 1:
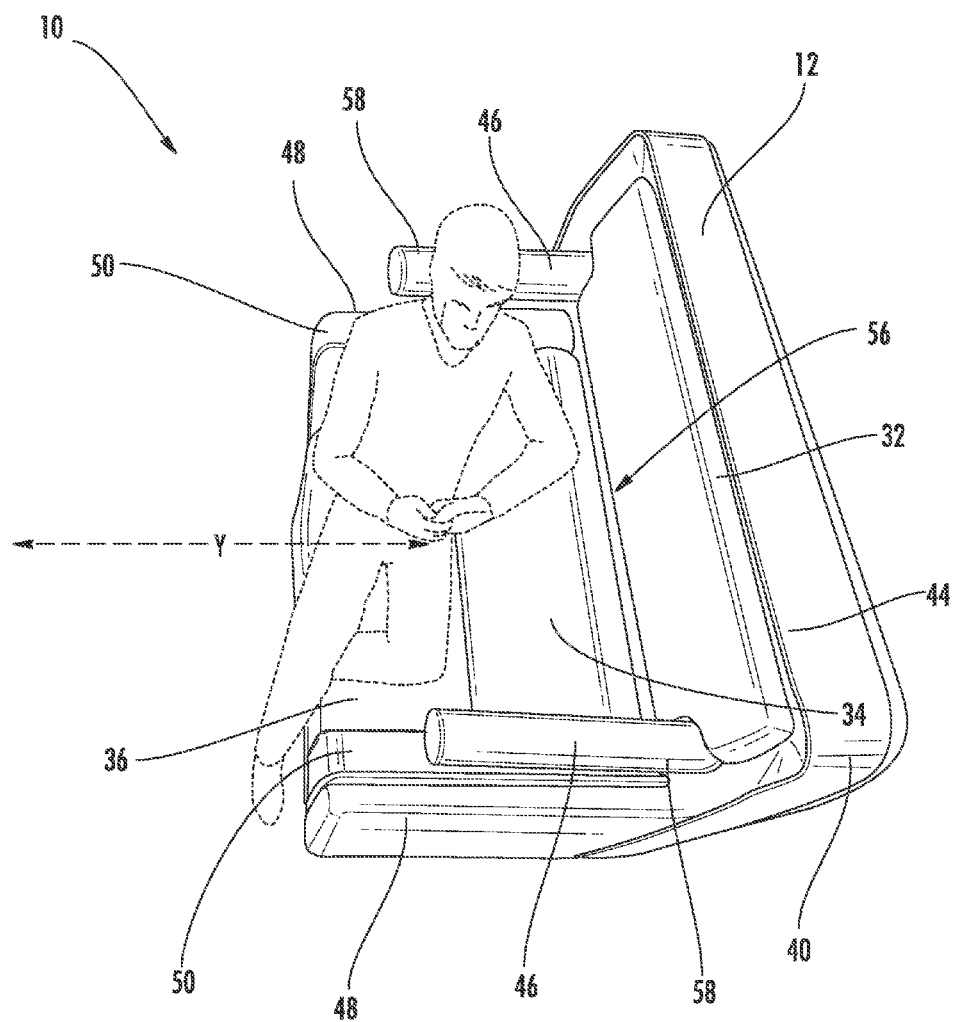
FIG. 1 is a perspective view of a seat unit in a fully upright position, according to certain embodiments of the present invention.
Figure 2:
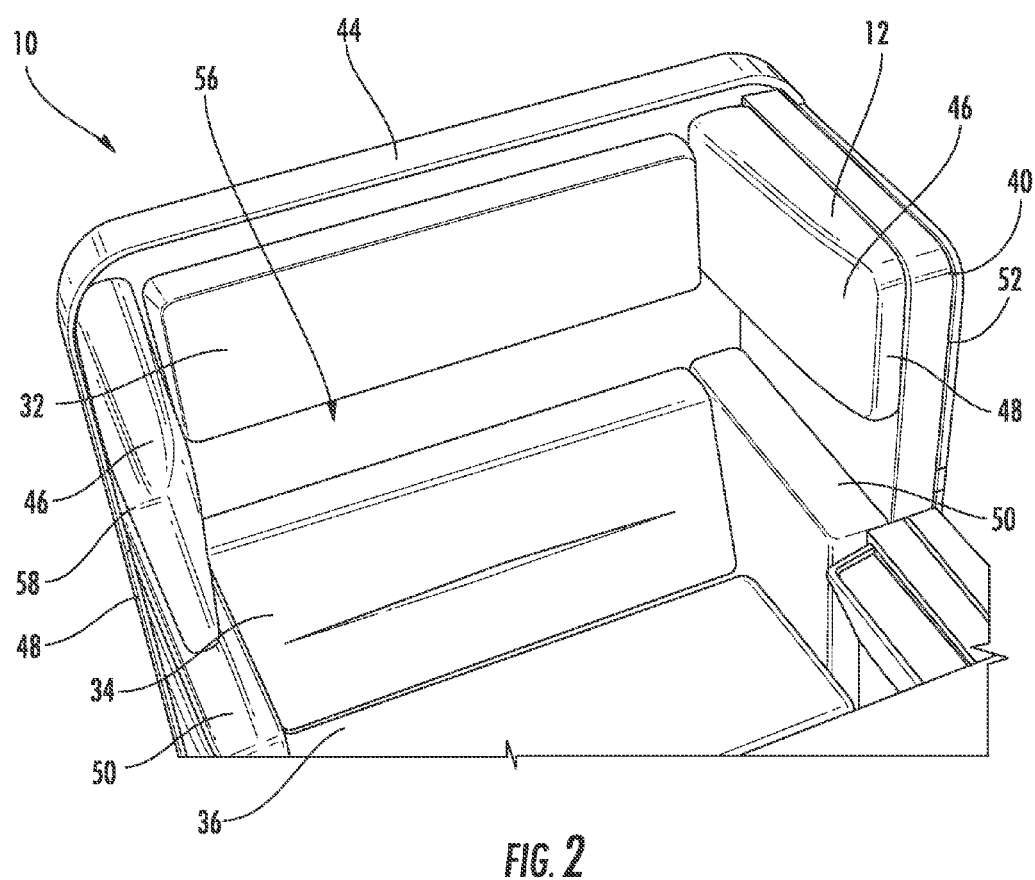
FIG. 2 is a perspective view of a seat unit in a fully upright position, according to certain embodiments of the present invention.
Figure 3:
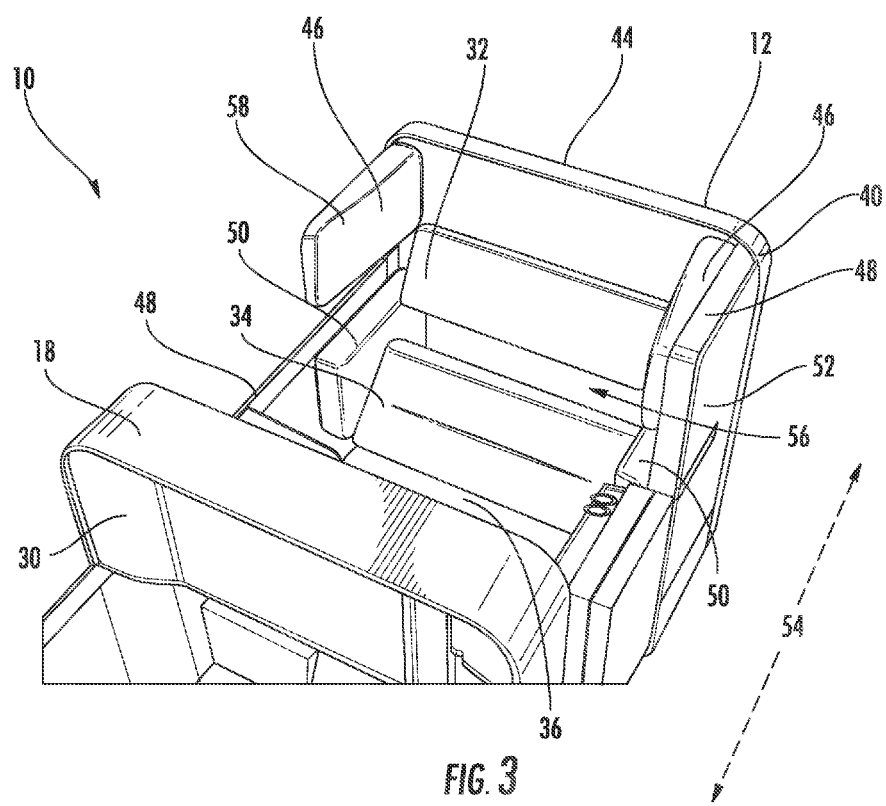
FIG. 3 is a perspective view of the seat unit of FIG. 2 in a fully reclined position.
Figure 4:
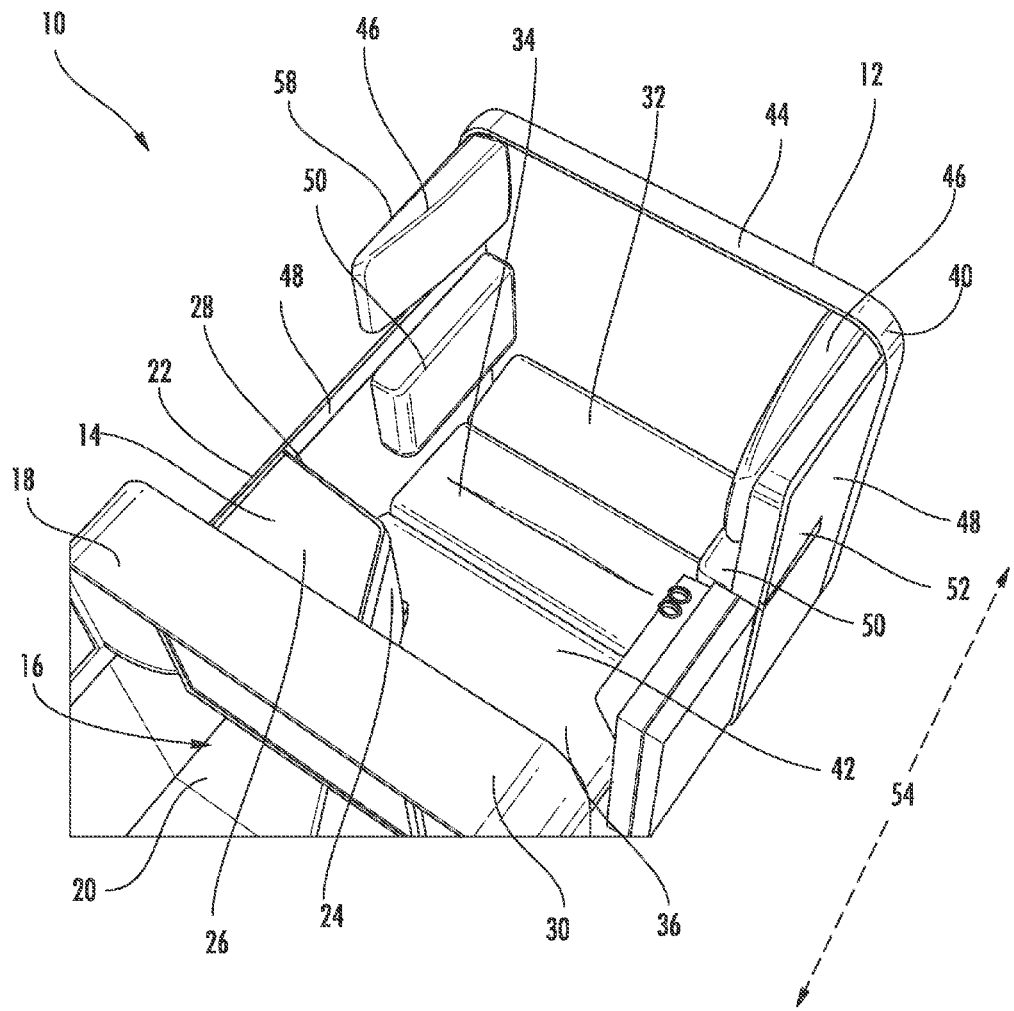
FIG. 4 is a perspective view of the seat unit of FIG. 2 in a bed position.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

While the embodiments of seat units may be described with reference to an aircraft cabin, they are by no means so limited. In fact, the seat units may be used in conjunction with any type of vehicle cabin or otherwise as desired.

According to certain embodiments of the present invention, as illustrated in FIGS. 1-14, a seat unit 10 comprises at least one seat 12 and at least one footwell 14, wherein the seat 12 is arranged facing an opening 16 in the footwell 14.

Each seat 12 comprises an upper seat back cushion 32, a lower seat back cushion 34, a seat pan cushion 36, and, optionally, a leg rest cushion 38, which are partially surrounded by a shell 40. Furthermore, each seat 12 is configured to convert between a seat position that ranges from a fully upright position (as best illustrated in FIGS. 1-2, 5A, 6A, 9A-9B, and 10A) to a fully reclined position (as best illustrated in FIGS. 3, 5B, 6B, and 10B), and a bed position that is substantially horizontal in flight (as best illustrated in FIGS. 4, 5C, 6C, 7A-7B, and 8).

In the seat position (also referred to as a "TTL" or taxi, take-off, landing position), the upper seat back cushion 32 is positioned adjacent a rear wall 44 of the shell 40 at a location that is above and slightly spaced apart or separated from the lower seat back cushion 34 by a gap 56. The gap 56 is configured to provide an arm rest over the lower seat back cushion 34.

1. Seat Kinematics

As best illustrated in FIGS. 5A-5C and 6A-6C, the upper seat back cushion 32 is coupled to the lower seat back cushion 34 by a kinematic that is configured to convert the seat 12 into the bed position by lowering the upper seat back cushion 32 until it closes the gap 56 between the upper seat back cushion 32, and the upper seat back cushion 32 contacts the lower seat back cushion 34. The kinematic then transitions the seat pan cushion 36 toward the footwell 14, and rotates and transitions the seat back cushions 34, 32 into a horizontal position adjacent the seat pan cushion 36 so that the cushions are positioned adjacent one another so as to form a substantially horizontal bed surface 42 in the bed position. The kinematic therefore provides a smooth transition between bed and seat positions, without the need for a passenger to adjust his position on the seat 12 other than to extend his legs when transitioning into the bed position and bend his legs when transitioning into the seat position.

In some embodiments, the kinematic may also be configured to raise the leg rest cushion 38 into a substantially horizontal position so that the leg rest cushion 38 may also form part of the bed surface 42. However, in other embodiments, the leg rest cushion 38 may remain in the stowed position below the bed surface 42.

In these embodiments, the kinematic that adjusts the height of the upper seat back cushion 32 is also able to adjust the angled position of the seat back cushions 32, 34 (while the seat back cushions 32, 34 are positioned adjacent one another) to provide appropriate back support over a range of recline angles, which is not possible if the upper seat back cushion were fixed in a stationary position on the rear wall 44 of the shell 40.

For example, FIGS. 5A-5C illustrate certain embodiments of the kinematic transitioning the seat 12 between seat and bed positions. In FIG. 5A, the seat 12 is in a fully upright position, and the gap 56 is greatest between the upper seat back cushion 32 and the lower seat back cushion 34, and may range from 50-400 mm in the fully upright position. In FIG. 5B, the seat 12 is in a reclined seat position, wherein the gap 56 is smaller. In the fully reclined position, the gap 56 may range from 0-400 mm. Finally, in FIG. 5C, the seat is in the bed position, and the gap 56 has been eliminated by bringing the cushions 32, 34 flush with one another.

In FIGS. 6A-6C, the kinematic is configured to provide different lifting angles for the upper seat back cushion 32 and the lower seat back cushion 34. For example, in FIG. 6A, the seat 12 is in a fully upright position, the gap 56 is in the greatest position (and may range from 50-400 mm in the fully upright position), and the cushions 32, 34 are arranged in substantially the same plane (substantially the same position as FIG. 5A). However, in FIG. 6B, the upper seat back cushion 32 is lowered so that the gap 56 is smaller (ranging from 0-400 mm in the fully reclined position) but remains in substantially the same vertical orientation as FIG. 6A, whereas the lower seat back cushion 34 is angled relative to the upper seat back cushion 32 by an angle $\alpha$, which may range from 1-30 degrees. The angled position of the lower seat back cushion 34 increases the available space in the reclined position. Finally, in FIG. 6C, the seat is in the bed position, the gap 56 has been eliminated, and the cushions 32, 34 are once again arranged in substantially the same plane (substantially the same position as FIG. 6C).

In certain embodiments, the kinematic may provide an option to adjust the angle of the lower seat back cushion 34 in the reclined position between the position shown in FIG. 5B to the position shown in FIG. 6B, or any other suitable range of angles.

2. Overlapping Seat Arrangement

In certain embodiments, as illustrated in FIGS. 3-4, 7A-7B, and 13-14, the seat unit 10 may comprise two seats 12, wherein the seats 12 are arranged to face one another, and a partition 18 is positioned between the seats 12. Each seat 12 may be arranged so that it is substantially laterally aligned with the other seat 12 with respect to the longitudinal axis Y of the seat unit 10. While the seat units 10 may be discussed with reference to two seats 12, they are by no means so limited. For example in certain embodiments, the seat unit 10 may comprise one seat 12 with one footwell 14.

Each footwell 14 may comprise a stationary lower surface 20 and vertically oriented sides 22, 24. In certain embodiments, the vertically oriented side 22 of each footwell 14 may form at least a portion of an outer wall of the partition 18. As a result, the vertically oriented sides 22 may be arranged substantially parallel to a longitudinal axis of the cabin.

In some embodiments, the two footwells 14 share the same inner vertically oriented side 24. The side 24 may be laterally angled so that the lateral dimension of each footwell 14 is wider at the opening 16 closer to the mating seat 12, and narrower at an opposing end of the footwell 14.

Each footwell 14 may be further enclosed by an upper surface 26 and a rear surface 28. The upper surface 26 of each footwell 14 may also serve as a table top, work surface, dining surface, cocktail table, or other usable surface for a passenger seated in the opposing seat 12 (i.e., the seat 12 that does not have access to the opening 16 in the footwell 14). The portion of the footwell 14 that is enclosed by the upper surface 26 and the rear surface 28 may extend into the space occupied by a passenger seated in the opposing seat 12. The space allotted to each passenger in the seat unit 10 may be further separated by an upper wall 30 that forms a portion of the partition 18 that extends above the footwells 14 and provide a location for mounting monitors, other electronic devices, and/or other stowage compartments.

The stationary lower surface 20 of each footwell 14 forms a lower surface of the enclosed portion, which may be configured to extend beyond the enclosed portion and upper wall 30 into the space of a passenger seated in the mating seat 12. The sides 22 and 24 may also be configured to extend a similar distance into the space of the passenger seated in the mating seat 12.

The stationary lower surface 20 of each footwell 14 is positioned at a height that substantially aligns and mates with the leg rest cushion 38 in the bed position so that the combination of the stationary lower surface 20, the leg rest cushion 38, the seat pan cushion 36, and the seat back cushions 34, 32 form the bed surface 42 that utilizes substantially all of the available space allocated within the seat unit 10 for each seat 12.

Figure 7A:
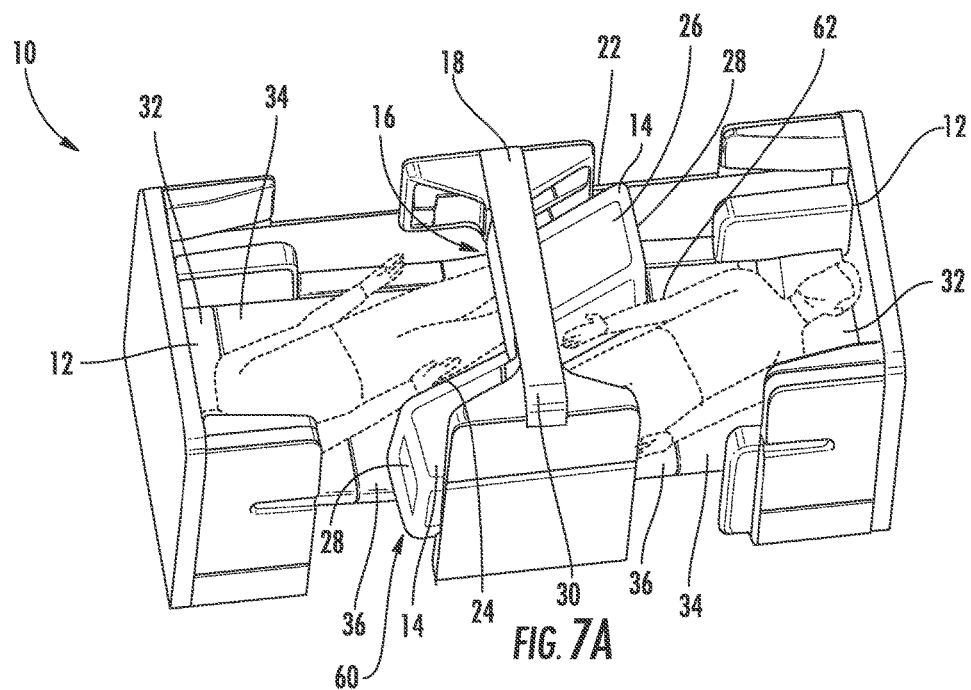
FIG. 7A is a perspective view of a seat unit comprising two facing seats in the bed position, according to certain embodiments of the present invention.
Figure 7B:
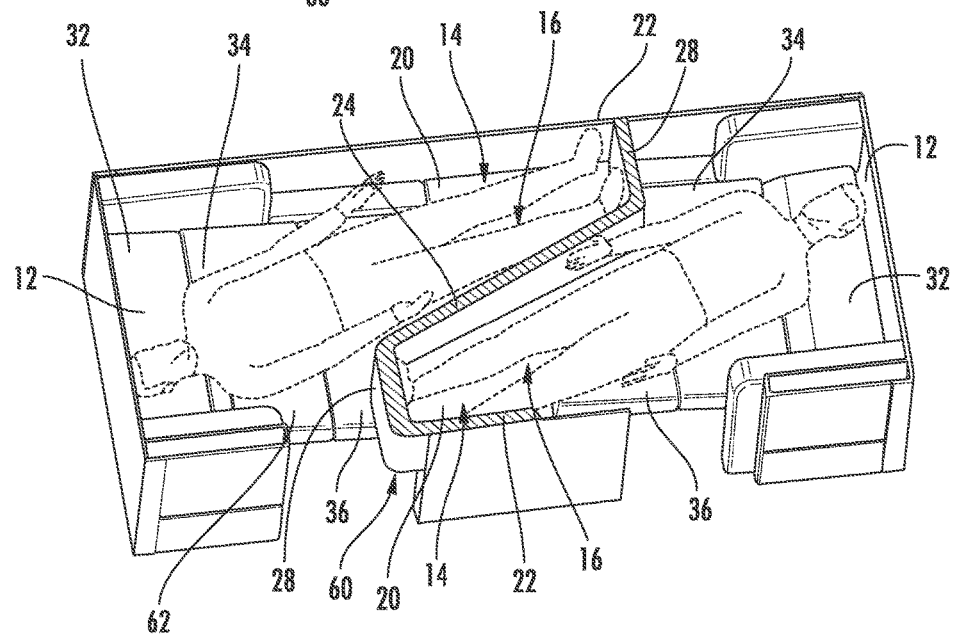
FIG. 7B is a cutaway view of the lower portion of the seat unit of FIG. 7A.
Figure 8:
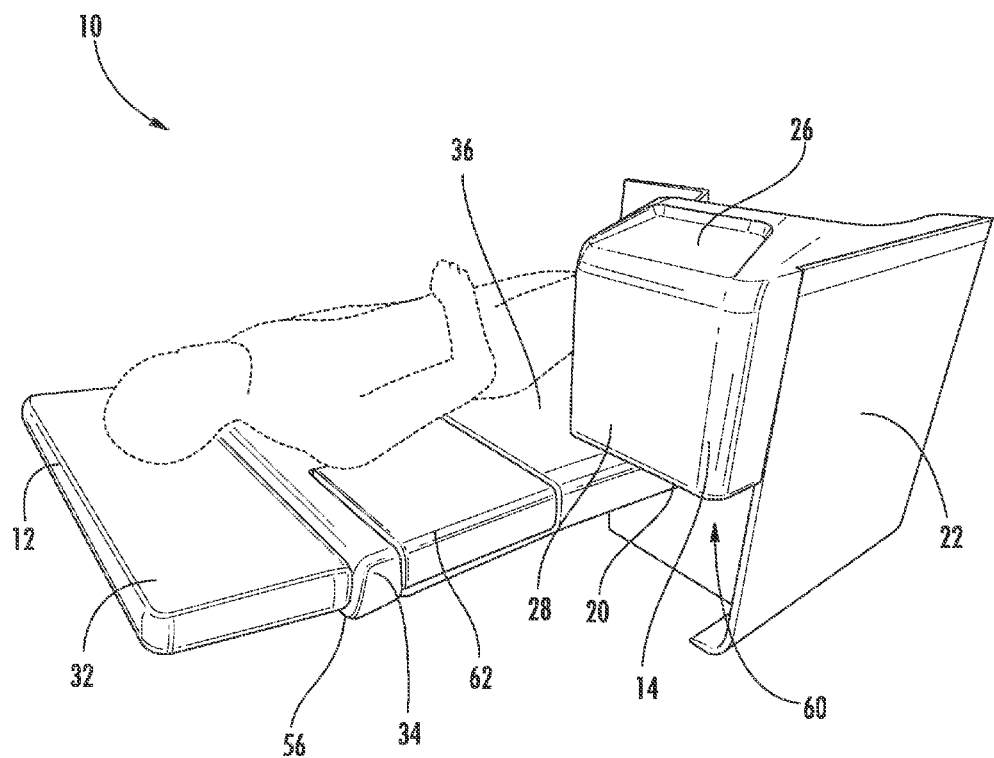
FIG. 8 is a perspective view of a seat unit in the bed position showing the positioning of a portion of a seat pan cushion below a footwell, according to certain embodiments of the present invention.

In the embodiments where a second footwell 14 (positioned with the opening 16 toward an opposing seat 12) extends into the space occupied by a passenger seated in the seat 12, in the bed position, a portion of the seat pan cushion 36 may be positioned below the second footwell 14. To accomplish this arrangement, the footwell 14 may be shaped with a recess 60 that is configured to allow the portion of the seat pan cushion 36 to extend into the recess in the bed position, as best shown in FIGS. 7A-7B and 8. In other embodiments, an additional kinematic may be used to lower a portion of the seat pan cushion 36 so that it extends below the second footwell 14.

3. Armrest Integration

As best illustrated in FIG. 1, the seat 12 has a width that is wider than a conventional business class passenger seat, the wider dimension allowing a passenger to be seated in multiple orientations. For example, a passenger may be seated so as to have his or her body oriented in a direction that is substantially parallel to the longitudinal axis Y of the seat unit 10, or the passenger may be seated so as to have his or her body oriented in a direction that is angled (or even substantially perpendicular) to the longitudinal axis Y of the seat unit 10.

In order to accommodate the various seat arrangement options, a variety of locations for armrests 50 have been incorporated into the seat 12.

First, as described above, the gap 56 between the upper seat back cushion 32 and the lower seat back cushion 34 allows a passenger to use to the top of the lower seat back cushion 34 as an armrest when the passenger is seated at an angle to the longitudinal axis Y.

Additionally and/or alternatively, as illustrated in FIGS. 1-4, an armrest cushion 50 may be positioned on one or both side walls 48 of the shell 40 that is below and slightly spaced apart from the headrest cushion 46. One or both armrest cushions 50 may be positioned at a height that substantially aligns with a height of the lower seat back cushion 34 when the seat 12 is in the upright seat position or may be at different heights as needed or desired.

In certain embodiments, as best illustrated in FIGS. 8, 9A-9B, 10A-10B, 11A-11D, and 12A-12B, at least one adjustable armrest 62 may be incorporated into the lower seat back cushion 34 to provide additional armrest support options. Because the armrest 62 is configured to stow substantially flush with the lower seat back cushion 34, the armrest 62 appears to be pivotally coupled to the lower seat back cushion 34 proximate a pivot axis 64 positioned at the location where a front edge 66 of the armrest 62 and a front edge 68 of the lower seat back cushion 34 join.

A pivot mechanism 70 is not included at the pivot axis 64 because the pivot mechanism 70 would form a hard object that could easily be detected through the surface of the armrest 62 in this location, particularly when the seat 12 is in the bed position. As a result, the pivot mechanism 70 may be positioned on the opposite side of the armrest 62 and the lower seat back cushion 34 at a location where a back edge 72 of the armrest 62 and a back edge 74 of the lower seat back cushion 34 join. By locating the pivot mechanism 70 behind the armrest 62 and the lower seat back cushion 34, the armrest 62 has the same thickness and cushioning as the lower seat back cushion 34, which provides a comfortable experience for the passenger positioned on the seat 12 in the bed position regardless of whether he or she is lying on the armrest 62 or the lower seat back cushion 34.

In order to use the back edge position to create the front edge pivot axis 64, the pivot mechanism 70 may be configured with an arcuate track 76 that moves the back edge 72 of the armrest 62 about the virtual pivot axis 64 along an arc. The track 76 may be coupled to a fixed location on a support for lower seat back cushion 34 and positioned so that a lower end 96 of the track 76 is positioned proximate the back edge 74 of the lower seat back cushion 34.

To couple the armrest 62 to the pivot mechanism 70, a support plate 80 may be fixedly coupled to a lower surface 82 of the armrest 62 and slidingly coupled to a base plate 92. In some embodiments, the base plate 92 may be pivotally coupled to a pivot location 94 on the framework of the track 76. The support plate 80 may also be coupled to a first end 84 of at least one arcuate arm 86 at a location that is proximate the back edge 72 of the armrest 62.

A projection 88 may then be coupled to or configured to extend from a second end 90 of the arm 86. In some embodiments, the projection 88 may be positioned between second ends 90 of a pair of arms 86. The arm 86 may then be coupled to the track 76 by positioning the projection 88 within the track 76.

In certain embodiments, the shapes of the arms 86 and track 76 are complementary so that when the projection 88 is positioned at an upper end 98 of the track 76, the arms 86 are positioned substantially alongside the track 76. A person of ordinary skill in the relevant art will understand that other suitable shapes of the arms 86 and track 76 may be used that provide the desired rotational movement of the armrest 62.

In a stowed position, as illustrated in FIGS. 8, 9B, and 11A, the projection 88 is positioned proximate the upper end 98 of the track 76, which in turn positions the arms 86 substantially alongside the track 76 so that the first end 84 of the arm (and thus the back edge 72 of the armrest 62) is positioned alongside the lower end 96 of the track 76 (and thus the back edge 74 of the lower seat back cushion 34). In the stowed position, the base plate 92 is also rotated into a position that is substantially parallel to the position of the lower seat back cushion 34, and the support plate 80 is positioned substantially proximate the pivot location 94.

To deploy the armrest 62 into one of the deployed positioned illustrated in FIGS. 9A, 10A-10B, 11B-11C, the armrest 62 is rotated away from the stowed position toward the front of the seat 12. With this frontward rotation, the projection 88 moves along the track 76 toward the lower end 96 of the track 76. This movement also causes the arms 86 to move toward the front of the seat 12 and away from the track 76, thus extending the combined arcuate length of the track 76 and the arms 86. In certain embodiments, the arcuate length between the upper end 98 and the lower end 96 of the track 76 is approximately 90 degrees, but can range from 60-120 degrees.

The frontward movement of the armrest 62 also causes the base plate 92 to rotate in a frontward direction away from the position that is substantially parallel to the position of the lower seat back cushion 34. However, because the base plate 92 is rotating about the fixed pivot location 94 and the support plate 80 is moving via the forward and angular motion of the arms 86, the support plate 80 slides frontward along the base plate 92 and away from the pivot location 94. Because the base plate 92 is shaped to continue to extend along a substantial surface of the support plate 80, the armrest 62 is supported and stabilized by the base plate 92.

To hold the armrest 62 in any of the desired deployed positions, a friction hinge (or any suitable ratchet mechanism) 100 may be incorporated into the pivot location 94. In some embodiments, the device 100 may be designed to eliminate the torque required to move the device 100 in the frontward direction, while requiring an excessive torque to overcome the hinge resistance torque necessary to move the device 100 in the rearward direction until the device 100 reaches an unlocking position (as shown in FIG. 11D). In the unlocking position, the device 100 is extended to a position where the torque required to move the device 100 in the rearward direction is eliminated until the device 100 has returned to the stowed position. In other embodiments, the armrest 62 may be secured into place after adjustment by a variety of mechanisms, including but not limited to a securing mechanism, adjustable fastener, or button mechanism.

The armrest 62 is also configured to have a range of deployed positions to accommodate a range of reclined positions of the lower seat back cushion 34. For example, because it is desirable for the armrest 62 to be maintained in a substantially horizontal orientation, the pivot mechanism 70 is configured to allow a deployed angle between the armrest 62 and the lower seat back cushion 34 to be adjusted to accommodate different reclined positions. In other words, as illustrated in FIG. 10A, in the upright position, the armrest 62 forms a deployed angle β with the lower seat back cushion 34, where the deployed angle β may range from 60-100 degrees. As illustrated in FIG. 10B, in the fully reclined position, the armrest 62 forms a deployed angle γ with the lower seat back cushion 34, where the deployed angle γ may range from 35-95 degrees.

4. Headrest Design

As illustrated in FIGS. 1-4, the shell 40 may further comprise at least one headrest cushion 46 positioned on one or both side walls 48 of the shell 40. The headrest cushion 46 may be vertically aligned with the fully raised height of the upper seat back cushion 32 or may be at different heights as needed or desired.

In some embodiments, the shell 40 may only comprise one side wall 48 and/or may comprise a second side wall 48 that only extends to a lower height, such as a location of an armrest cushion 50, which is described in more detail below. In some embodiments, as shown in FIG. 1, both side walls 48 may be shortened to a lower height.

The elimination and/or minimization of the height of one or both side walls 48 may utilized to reduce the weight of the seat unit 10. For example, in embodiments where the location of the second side wall 48 is adjacent a wall of the cabin, the additional structural separation and/or full height of the side wall 48 is not needed.

In these embodiments, the headrest cushion 46 may be attached to the shell 40 via a projection 58 that extends from the rear wall 44 of the shell 40. The projection 58 may be configured to extend from the rear wall 44 into the space where the headrest cushion 46 is to be positioned and, in some embodiments, may be positioned above the shortened side wall 48.

5. Closet

In certain embodiments, as shown in FIGS. 13-14, the seat unit 10 comprises a closet 52 for each seat 12. The closet 52 may be positioned adjacent one or both of the side walls 48 of each seat 12, such as the side wall 48 that is adjacent an aisle 54 of the cabin. In these embodiments, the closet 52 may comprise the entire side wall 48 or may only be attached to an outer surface of the side wall 48.

In certain embodiments, the closet 52 is configured to pivot into the aisle 54 (similar to a door), which provides additional space to access the seat 12 from the aisle, with is particularly helpful for disabled passengers. The closet 52 is mounted on hinges that are locked in place until additional access room is needed.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A seat unit comprising:
   two seats facing one another such that each seat comprises an upper seat back cushion, a lower seat back cushion, and a seat pan cushion, wherein each seat is configured to transition between a seat position and a bed position; and
   two footwells arranged facing in opposing directions so that an opening in each footwell is accessible by a passenger seated in one of the two seats that faces the opening in the footwell, wherein:
   the two seats are substantially laterally aligned with each other and with respect to a longitudinal axis of the seat unit;
   a portion of the seat pan cushion of one of the two seats fits into a recess below the footwell with the opening that faces away from the seat;
   the upper seat back cushion comprises a width that is approximately equal to a width of the lower seat back cushion; and
   the upper seat back cushion and the lower seat back cushion are separated by a gap in a vertical direction of the seat unit located between an end of each cushion when each seat is in the seat position, and the ends of the upper seat back cushion and the lower seat back cushion are flush with each other when each seat is in the bed position.

2. The seat unit of claim 1, wherein the seat pan cushion is positioned below a passenger's buttocks when each seat transitions between the seat position and the bed position without additional adjustment by the passenger.

3. The seat unit of claim 1, wherein each footwell comprises a lower surface having an end that is positioned flush with an end of the seat pan cushion to form a horizontal bed surface in the bed position.

4. The seat unit of claim 1, further comprising an armrest pivotally coupled to the lower seat back cushion by a pivot mechanism, wherein the pivot mechanism is coupled to a back edge of the lower seat back cushion and to a back edge of the armrest and is configured to move the back edge of the armrest along an arc, forming a pivot axis between a front edge of the lower seat back cushion and a front edge of the armrest.

5. The seat unit of claim 1, further comprising an armrest pivotally coupled to the lower seat back cushion by a pivot mechanism, wherein a deployed angle of the armrest is adjustable to achieve a substantially horizontal orientation of the armrest when each seat is in an upright position or a reclined position.

6. The seat unit of claim 1, further comprising an armrest pivotally coupled to the lower seat back cushion by a pivot mechanism, wherein the pivot mechanism comprises a friction hinge or ratchet mechanism to maintain a deployed angle of the armrest.

7. The seat unit of claim 1, further comprising an armrest pivotally coupled to the lower seat back cushion by a pivot mechanism, wherein the location of the pivot mechanism allows the armrest to have the same cushioning thickness as the lower seat back cushion.

8. The seat unit of claim 1, wherein the seat unit further comprises a closet pivotally coupled to a location adjacent each seat and is configured to pivot away from each seat to provide additional space to access each seat.

9. The seat unit of claim 1, wherein the gap is between an uppermost end of the lower seat back cushion and a lowermost end of the upper seat back cushion.

10. The seat unit of claim 1, wherein the upper seat back cushion comprises a cross section that is approximately equal to a cross section of the lower seat back cushion.

11. The seat unit of claim 1, wherein the upper seat back cushion is contiguous and axially aligned with the lower seat back cushion.

12. The seat unit of claim 1, wherein, when each seat is in the seat position, an uppermost end of the lower seat back cushion is disposed below a shoulder of a passenger seated on each seat such that the passenger can use the uppermost end of the lower seat back cushion as an arm rest.

13. The seat unit of claim 1, wherein:
when each seat is in the seat position, the upper seat back cushion and the lower seat back cushion are substantially parallel with one another; and
when each seat is in the bed position, the upper seat back cushion and the lower seat back cushion are substantially parallel with one another.

14. The seat unit of claim 13, wherein:
each seat transitions to a reclined position between the seat position and the bed position; and
when each seat is in the reclined position, the upper seat back cushion and the lower seat back cushion are non-parallel with one another.

15. A seat unit comprising:
two seats facing one another such that each seat comprises an upper seat back cushion and a lower seat back cushion, wherein each seat is configured to transition between an upright position, a reclined position, and a bed position; and
two footwells arranged facing in opposing directions so that an opening in each footwell is accessible by a passenger seated in one of the two seats that faces the opening in the footwell, wherein:
the two seats are substantially laterally aligned with each other and with respect to a longitudinal axis of the seat unit;
a portion of a seat pan cushion of one of the two seats fits into a recess below the footwell with the opening that faces away from the seat;
the upper seat back cushion and the lower seat back cushion are separated by a gap in a vertical direction of the seat unit located between an end of each cushion when each seat is in the upright position and the reclined position, and the ends of the upper seat back cushion and the lower seat back cushion are flush with each other when each seat is in the bed position; and
the lower seat back cushion is substantially parallel with the upper seat back cushion in the upright position and the bed position, and the lower seat back cushion is angled with respect to the upper seat back cushion in the reclined position.

16. The seat unit of claim 15, further comprising an armrest pivotally coupled to the lower seat back cushion by a pivot mechanism, wherein the pivot mechanism is coupled to a back edge of the lower seat back cushion and to a back edge of the armrest and is configured to move the back edge of the armrest along an arc, forming a pivot axis between a front edge of the lower seat back cushion and a front edge of the armrest.

17. The seat unit of claim 15, further comprising an armrest pivotally coupled to the lower seat back cushion by a pivot mechanism, wherein a deployed angle of the armrest is adjustable to achieve a substantially horizontal orientation of the armrest when each seat is in the upright position or the reclined position.

18. The seat unit of claim 15, further comprising an armrest pivotally coupled to the lower seat back cushion by a pivot mechanism, wherein the pivot mechanism comprises a friction hinge or ratchet mechanism to maintain a deployed angle of the armrest.

19. The seat unit of claim 15, further comprising an armrest pivotally coupled to the lower seat back cushion by a pivot mechanism, wherein the location of the pivot mechanism allows the armrest to have the same cushioning thickness as the lower seat back cushion.

20. The seat unit of claim 15, wherein the seat unit further comprises a closet pivotally coupled to a location adjacent each seat and is configured to pivot away from each seat to provide additional space to access each seat.

21. The seat unit of claim 15, wherein the upper seat back cushion comprises a width that is approximately equal to a width of the lower seat back cushion.

22. A seat unit comprising:
two seats facing one another such that each seat comprises a lower seat back cushion comprising an armrest pivotally coupled to the lower seat back cushion by a pivot mechanism; and
two footwells arranged facing in opposing directions so that an opening in each footwell is accessible by a passenger seated in one of the two seats that faces the opening in the footwell, wherein:
the two seats are substantially laterally aligned with each other and with respect to a longitudinal axis of the seat unit;
a portion of a seat pan cushion of one of the two seats fits into a recess below the footwell with the opening that faces away from the seat; and
the pivot mechanism is coupled to a back edge of the lower seat back cushion and to a back edge of the armrest and configured to move the back edge of the armrest along an arc, forming a pivot axis between a front edge of the lower seat back cushion and a front edge of the armrest.

23. The seat unit of claim 22, wherein a deployed angle of the armrest is adjustable to achieve a substantially horizontal orientation of the armrest when each seat is in an upright position or a reclined position.

24. The seat unit of claim 22, wherein the pivot mechanism comprises an arcuate track.

25. The seat unit of claim 22, wherein the pivot mechanism comprises a friction hinge or ratchet mechanism to maintain a deployed angle of the armrest.

26. The seat unit of claim 22, wherein the pivot mechanism is located such that the armrest has the same cushioning thickness as the lower seat back cushion.

* * * * *